219-121 SR
MTR08 XR 3,901,814

United States Patent [19] [11] 3,901,814
Davis et al. [45] Aug. 26, 1975

[54] METHOD AND APPARATUS FOR DETECTING A REGISTRATION MARK ON A TARGET SUCH AS A SEMICONDUCTOR WAFER

[75] Inventors: Donald E. Davis, Wappingers Falls; Millard A. Habegger, Poughkeepsie; Richard D. Moore, Hopewell Junction; Edward V. Weber; Ollie C. Woodard, both of Poughkeepsie, all of N.Y.

[73] Assignee: International Business Machines Corporation, Armonk, N.Y.

[22] Filed: June 27, 1974

[21] Appl. No.: 483,509

[52] U.S. Cl. ........................ 250/492 A; 219/121 EB
[51] Int. Cl.² ........................................ H01J 37/00
[58] Field of Search ........... 250/492 A; 219/121 EB; 29/584

[56] References Cited

UNITED STATES PATENTS

| | | | |
|---|---|---|---|
| 3,644,700 | 2/1972 | Kruppa | 250/492 A |
| 3,651,303 | 3/1972 | Rehme | 250/492 A |
| 3,745,358 | 7/1973 | Firty | 250/492 A |
| 3,832,561 | 8/1974 | O'Keefe | 250/492 A |

*Attorney, Agent, or Firm*—Frank C. Leach, Jr.; Theodore E. Galanthay
*Primary Examiner*—James W. Lawrence
*Assistant Examiner*—T. N. Grigsby

[57] ABSTRACT

A square-shaped beam of charged particles is passed over a registration mark, which is formed by a depression or a rise in the surface of a semiconductor wafer. When the beam passes over one edge of the mark, a positive peak signal is produced from a pair of diode detectors located with their surfaces orthogonal to the direction of the beam scan and a negative peak signal is produced when the beam passes over the other edge of the mark. The amplitudes of these peak signals are balanced so that they are substantially the same irrespective of the location of each of the diode detectors relative to the mark in comparison with the location of the other of the diode detectors relative to the mark. These peak signals are compared with positive and negative threshold signals in comparators with an output signal being produced from each of the comparators when its threshold signal is crossed. This enables location of each of the marks to be determined. The positive and negative threshold signals are set during the prior scan with the scans being in opposite directions. The peak to peak amplitude across the registration mark in a particular area is sampled during the first scan and used to provide an automatic gain factor for the remainder of the scans across the mark so that a substantially constant peak amplitude signal is transmitted to the comparators.

32 Claims, 18 Drawing Figures

METHOD AND APPARATUS FOR DETECTING A REGISTRATION MARK ON A TARGET SUCH AS A SEMICONDUCTOR WAFER

In the copending patent application of Michel S. Michail et al for "Method And Apparatus For Positioning A Beam Of Charged Particles," Ser. No. 437,585, filed Jan. 28, 1974, and assigned to the same assignee as the assignee of this application, there is shown a method and apparatus for controlling a square-shaped beam. The beam is employed to both write desired patterns on a semiconductor wafer and to locate each field within which a pattern is written through determining the position of a registration mark at each corner of the field.

One apparatus for locating each of the registration marks used with the various fields of a semiconductor wafer in the aforesaid Michail et al application is shown and described in the copending patent application of Ollie C. Woodard for "Method And Apparatus For Detecting A Registration Mark On A Target Such As A Semiconductor Wafer," Ser. No. 437,434, field Jan. 28, 1974, now U.S. Pat. No. 3,875,415, and assigned to the same assignee as the assignee of this application. The present invention is an improvement of the aforesaid Woodard application in that it can operate faster and still produce satisfactory results, obtain a more precise location of the mark if such is required, and enable the registration marks to be formed of much smaller depressions or steps if necessary.

The method and apparatus of the present invention is capable of operating two orders of magnitude faster than the method and apparatus of the aforesaid Woodard application. Thus, the location of each of the registration marks in a pattern writing field can be determined quicker with the present invention to decrease the processing time whereby production costs are lowered.

Because of the increased speed of the method and apparatus of the present invention, it is necessary for the scans of the beam across the mark to be in opposite directions rather than in a raster fashion, for example. This is because time delays in the circuits and filtering would produce signal distortions if the marks were scanned in a raster fashion. Of course, the method and apparatus of the present invention has certain other attributes which may be utilized when fast speed is not required so that the present invention can be employed with a beam scanning in raster fashion.

In some processing steps of a semiconductor wafer such as in certain FET processing, for example, the available depth of the material in which a step can be formed to function as a registration mark may be very limited. Thus, only a very small depth mark in comparison with those previously used at various levels of a semiconductor wafer may be available. The present invention is capable of producing positive and negative peak signals when the beam passes over the edges of these relatively small depth marks.

The present invention accomplishes this by utilizing a filter to eliminate the ramp voltage produced by the beam scanning over the semiconductor wafer in the area having the registration mark. The filter is capable of removing the ramp voltage and leaving only a residual baseline voltage. Thus, the very small positive and negative peak signals produced by a mark of relatively small depth can be obtained and used to identify the edges of the mark.

The present invention also is capable of balancing the amplitude of the peak electrical signals produced by the detecting means on opposite sides of the field having the registration mark that is being located. Because of the size of the detecting means used in the present invention and the relatively large field of the wafer within which the registration marks are located, it is necessary to balance the signals from the detecting means so that the amplitude of the signal from each of the detecting means is substantially the same irrespective of the location of the detecting means relative to the mark in comparison with the other of the detecting means.

By balancing the amplitude of the signals from the detecting means, no distortion is produced when the signals from the detecting means are subtracted from each other by a differential amplifier to obtain the peak signals. Without balancing of the amplitudes of the signals, a pedestal, which varies in magnitude depending on the depth of the mark and the material in which the mark is formed, can significantly distort the locations of the peak signals since the peak signals would be shifted on a time basis in comparison with where they actually occur during the beam scan. The pedestal is produced because of the material having the mark being different than the material beneath the mark.

Since each of the marks is not symmetrically disposed with respect to the detecting means, the scanning of the mark in opposite directions results in circuit delays, which can cause signal distortions if scanning were to occur in the same direction at the relatively high speed contemplated, being substantially cancelled. This is because the delay errors will be disposed in the same direction on a time basis when scanning in opposite directions is employed.

In the aforesaid Woodard application, the gain control factor was manually adjusted. The present invention is an improvement in that automatic gain control is employed. The automatic gain control of the present invention automatically adjusts the amplitude of the peak signals during the first scan over the area of the wafer having the mark and uses this same gain factor throughout the remainder of the scans over the mark. Thus, the material of the wafer, the geometry of the mark, the topography of the mark, and other factors concerning the target area have no effect on the amplitude of the peak signals.

An object of this invention is to provide a method and apparatus for locating a registration mark on a target such as a semiconductor wafer.

Another object of this invention is to provide a sensing arrangement for detecting the location of the registration marks of a target such as a semiconductor wafer in which the sensing arrangement adapts to any signal condition.

A further object of this invention is to provide a method and apparatus for locating a registration mark on a target such as a semiconductor wafer in which there is automatic compensation for the type of wafer, the conditions of the wafer, the geometry of the mark, and the topography of the mark.

Still another object of this invention is to provide a method and apparatus for locating a registration mark on a target such as a semiconductor wafer in which the speed in locating the mark is substantially increased.

The foregoing and other objects, features, and advantages of the invention will be apparent from the following more particular description of a preferred embodiment of the invention.

Figure 1:
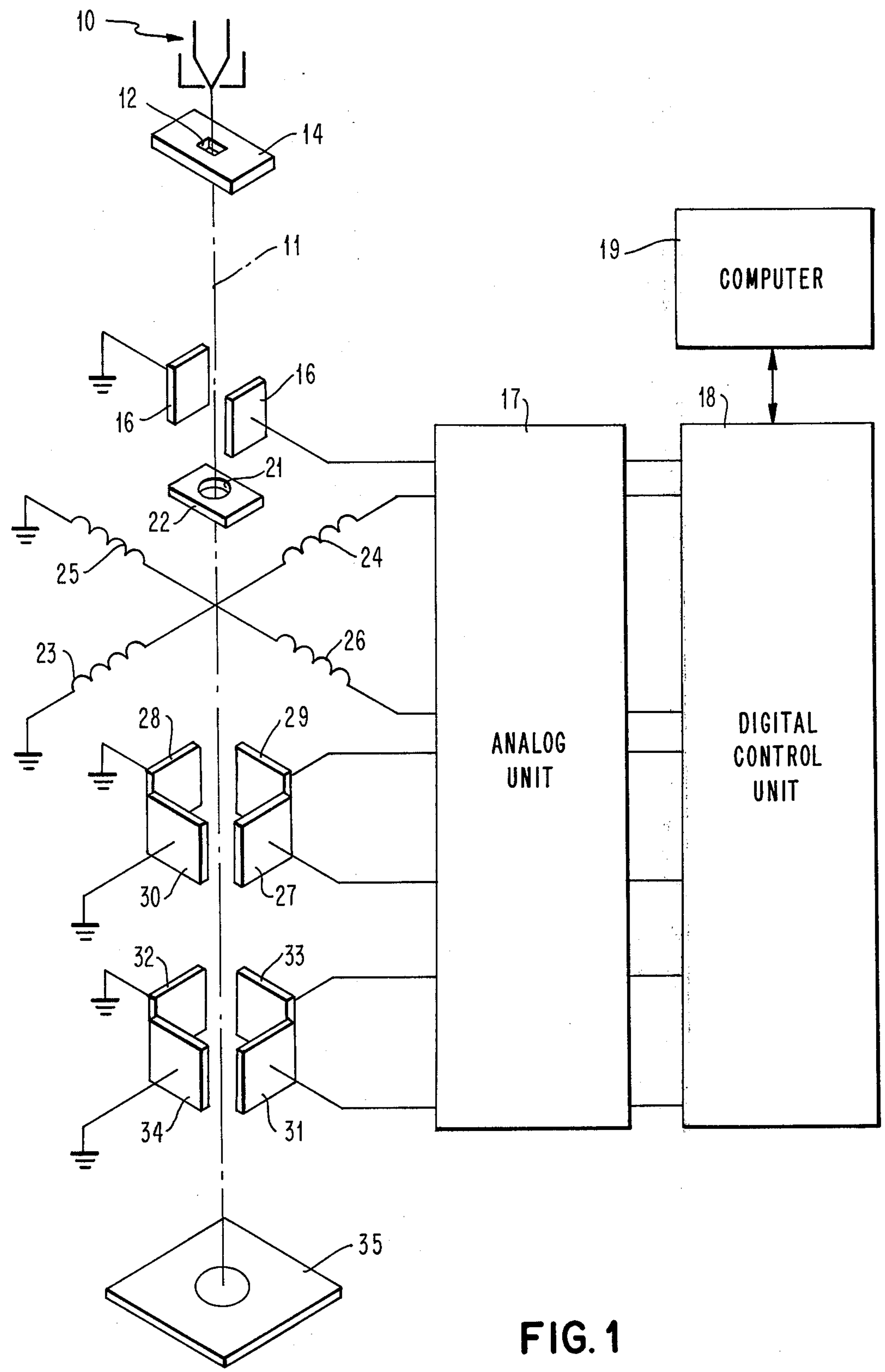
FIG. 1 is a schematic view showing an electron beam and the apparatus for controlling the beam.

Referring to the drawings and particularly FIG. 1, there is shown an electron gun 10 for producing a beam 11 of charged particles in the well-known manner. The electron beam 11 is passed through an aperture 12 in a plate 14 to shape the beam 11. The beam 11 is preferably square shaped and has a size equal to the minimum line width of the pattern that is to be formed.

The beam 11 passes between a pair of blanking plates 16, which determine when the beam 11 is applied to the material and when the beam 11 is blanked. The blanking plates 16 are controlled by circuits of an analog unit 17. The analog unit 17 is controlled by a digital control unit 18 in the manner more particularly shown and described in the copending patent application of Philip M. Ryan for "Method And Apparatus For Controlling Movable Means Such As An Electron Beam," Ser. No. 398,734, filed Sept. 19, 1973, now U.S. Pat. No. 3,866,013, and assigned to the same assignee as the assignee of this application. The digital control unit 18 is connected to a computer 19, which is preferably an IBM 370 computer.

The beam 11 then passes through a circular aperture 21 in a plate 22. This controls the beam 11 so that only the charged particles passing through the centers of the lenses (not shown) are used so that a square-shaped spot without any distortion is produced.

Figure 3:
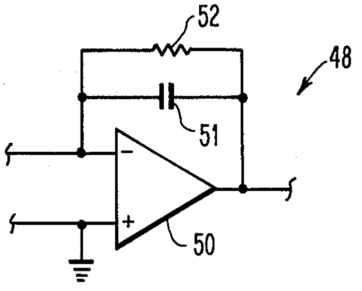
FIG. 3 is a schematic wiring diagram of the preamplifier circuit of FIG. 2.

The beam 11 is next directed through magnetic deflection coils 23, 24, 25, and 26. The magnetic deflection coils 23 and 24 control the deflection of the beam 11 in a horizontal or X direction while the magnetic deflection coils 25 and 26 control the deflection of the beam 11 in a vertical of Y direction. Accordingly, the coils 23–26 cooperate to move the beam 11 in a horizontal scan by approximately deflecting the beam. While the beam 11 could be moved in a substantially raster fashion as shown and described in U.S. Pat. No. 3,644,700 to Kruppa et al, it is preferably moved in a back and forth scan so that the beam 11 moves in opposite directions along adjacent lines as shown and described in the aforesaid Ryan and Michail et al applications. Thus, a bucking sawtooth is supplied to the coils 23 and 24 during forward scan of the type shown in FIG. 3*b* of the aforesaid Kruppa et al patent while a positive bucking sawtooth, which is of opposite polarity to the sawtooth shown in FIG. 3*b* of the aforesaid Kruppa et al patent, is supplied to the coils 23 and 24 during the backward scan.

The beam 11 then passes between a first set of electrostatic deflection plates 27, 28, 29, and 30. The electrostatic deflection plates 27 and 28 cooperate to deflect the beam in a horizontal or X direction while the electrostatic deflection plates 29 and 30 cooperate to move the beam 11 in a vertical or Y direction. The plates 27–30 are employed to provide any desired offset of the beam 11 at each of the predetermined positions or spots to which it is moved. In the aforesaid Kruppa et al patent, the plates 27–30 corrected for linearity, but these correction signals are supplied to the coils 23–26 in the aforesaid Woodard application and this application.

After passing between the electrostatic deflection plates 27–30, the beam 11 then passes between a second set of electrostatic deflection plates 31, 32, 33, and 34. The electrostatic deflection plates 31 and 32 cooperate to deflect the beam 11 in the horizontal or X direction while the electrostatic deflection plates 33 and 34 cooperate to move the beam 11 in the vertical or Y direction. The plates 31–34 are employed to shift the beam 11, as more particularly shown and described in the aforesaid Michail et al application, at each of the predetermined positions to which the beam 11 is moved to move the beam 11 from the predetermined position to the actual deviated position at which the beam 11 must be applied to fit the pattern within the actual field.

The beam 11 is then applied to a target, which is supported on a table 35. The table 35 is movable in the X and Y directions as more particularly shown and described in the aforesaid Kruppa et al patent.

The beam 11 is moved through A, B, and C cycles as shown and described in the aforesaid Kruppa et al patent. The present invention is concerned with processing the signals during the A cycle of the beam 11 to detect the location of each of the registration marks.

Figure 16:
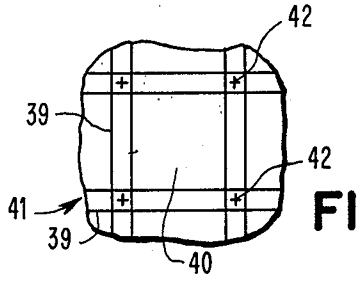
FIG. 16 is a top plan view of a portion of the semiconductor wafer having chips to which the beam is to be applied and showing the relation of the overlapped fields within which the chips are located.

As shown in FIG. 16, the target may comprise a plurality of fields 39 which overlap each other. A chip 40 is formed within each of the fields 39 so that there is a plurality of the chips 40 on a semiconductor wafer 41 with each of the chips 40 having resist to be exposed by the beam 11.

There is a registration mark 42 (schematically shown as a cross in FIG. 16) at each of the four corners of each of the fields 39. As shown in FIG. 16, the overlapping of the adjacent fields 39 results in the same registration mark 42 being utilized for each of four different fields 39. Thus, the registration mark 42 in the lower right corner of the only complete field 39 shown in FIG. 16 also is the registration mark in the lower left corner for the field 39 to the right of the complete field 39, the upper right corner of the field below the complete field 39, and the upper left corner of the field 39 which is diagonally to the right of the complete field 39.

Figure 17:
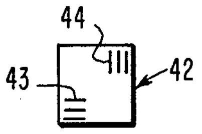
FIG. 17 is an enlarged top plan view of a registration mark that is to be detected.

Each of the registration marks 42 is preferably formed of a plurality of horizontally extending bars 43, preferably three in number as shown in FIG. 17, and a plurality of vertically extending bars 44, preferably equal in number to the number of the bars 43. Any other suitable arrangement of the registration mark 42 can be employed in which there can be scans of vertical edges of the mark in the X direction and horizontal edges of the mark in the Y direction.

As explained in the aforesaid Michail et al application, each of the fields 39 uses the registration mark 42 at each of the four corners to locate the field 39 in which writing of the pattern is to occur. The overlapping of the fields 39 enables writing to occur between the adjacent fields. The boundary of each of the chips 40 is within the overlapping area of the field 39 of the chip 40.

The exact location of each of the registration marks 42 is obtained through passing the electron beam 11 over the vertical edges of the vertically disposed bars 44 of the mark 42 during scans in the X or horizontal direction and over the horizontal edges of the horizontally disposed bars 43 of the mark 42 during scans in the Y or vertical direction. A registration detector is employed to detect when the electron beam 11 passes over each of the edges of the registration mark 42.

The registration detector preferably includes four diodes 45, 46, 45′, and 46′ (see FIG. 2) disposed above the semiconductor wafer 41 and having an opening formed therebetween through which the beam 11 passes to impinge upon a portion of the semiconductor wafer 41. The two diodes 45 and 46 are for the X scan and are disposed beyond the opposite ends of the X scans of the beam 11. The two diodes 45′ and 46′ are for the Y scan and are disposed beyond the opposite ends of the Y scans of the beam 11. The four diodes 45, 46, 45′, and 46′ are preferably arranged in a quadrant arrangement as shown in FIG. 2.

As the electron beam 11 passes over the vertical bars 44 of the registration mark 42 during an X scan, the backscatter of the electrons from the semiconductor wafer 41 changes when the beam 11 passes over one of the vertical edges of one of the bars 44 of the registration mark 42. Each of the bars 43 and 44 of the registration mark 42 is preferably formed by a depression in the surface of the wafer 41. Thus, when the beam 11 enters the depression, one of the diodes 45 and 46 produces a greater signal than the other of the diodes 45 and 46, and the reverse arrangement happens when the beam 11 moves out of the depression.

The detecting diodes 45, 46, 45′, and 46 are fully depleted, and each of the diodes 45, 46, 45′, and 46′ has a second diode 47, which functions as a guard ring. The detecting diodes 45, 46, 45′, and 46′ are turned with their junction side away from the beam 11 for protection. Each of the detecting diodes 45, 46, 45′, and 46′ is biased so that its side turned toward the beam 11 is at ground potential in order to not deflect the beam 11.

Figure 2:
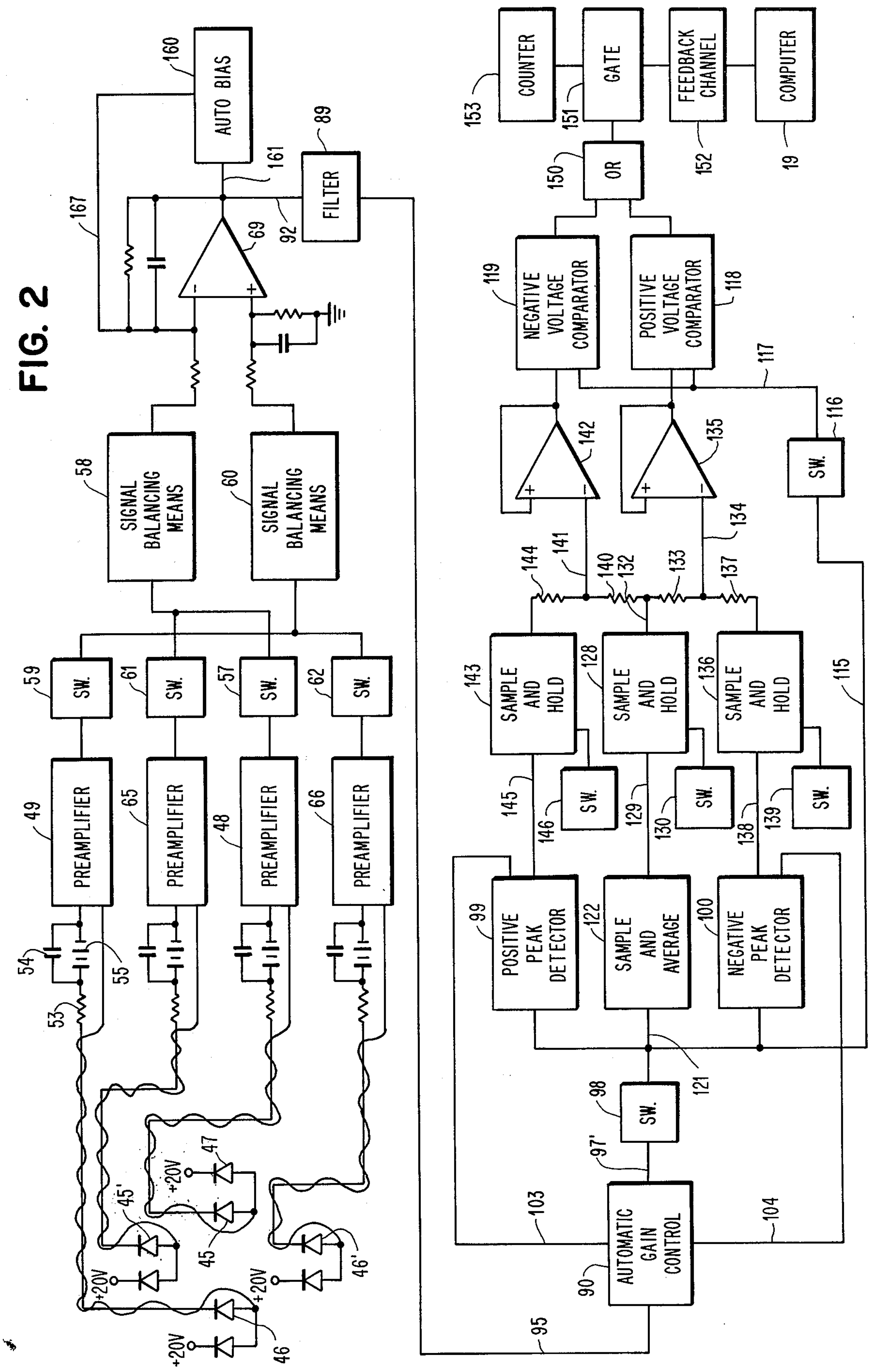
FIG. 2 is a schematic block diagram of a circuit arrangement for processing the signals for detecting a registration mark.

As shown in FIG. 2, the detecting diode 45 is connected to a preamplifier 48, and the detecting diode 46 is connected to a preamplifier 49. Each of the preamplifiers 48 and 49 includes an operational amplifier 50 (see FIG. 3) having a capacitor 51 and a resistor 52 connected in parallel to form a feedback and to control the gain and bandwidth of the preamplifier 48 or 49.

The anode of the detecting diode 45 or 46 is connected to the negative input of the operational amplifier 50 through a resistor 53 (see FIG. 2) and a capacitor 54, which is in parallel with a battery 55. The diode 47, which functions as a guard ring, is connected to a positive voltage source, which has a slightly smaller potential than the battery 55.

Each of the diodes 45 and 46 is connected to the positive input of the operational amplifier 50 and ground through a wire, which is wrapped around the wire between the cathode of the diode 45 or 46 and the resistor 53. This wrapping around of the wire supresses noise.

The output of the preamplifier 48 is connected through an electronic switch 57 to a signal balancing means 58. The output of the preamplifier 49 is supplied through an electronic switch 59 to a signal balancing means 60. Each of the electronic switches 57 and 59 is preferably an electronic switch sold by Teledyne Crystalonics as a model CAG 42. This electronic switch includes an FET and additional circuitry. It should be understood that all of the electronic switches, which will be referred to hereinafter, are the same type.

When the beam 11 is scanning in the X direction, the electronic switches 57 and 59 are activated. If the beam 11 is scanning in the Y direction, the electronic switches 57 and 59 are deactivated to disconnect the detecting diodes 45 and 46 from the signal balancing means 58 and 60, respectively.

When the beam 11 is scanning in the Y direction, electronic switches 61 and 62 are closed to enable the signals from the detecting diodes 45′ and 46′, utilized in the Y scans, to be supplied to the signal balancing means 58 and 60 by preamplifiers 65 and 66, which are the same as the preamplifiers 48 and 49, in the same manner as the signals are supplied from the preamplifiers 48 and 49 when the electronic switches 57 and 59 are closed. The electronic switches 61 and 62 are open when the beam 11 is scanning in the X direction.

The signal balancing means 58 and 60 are connected to a differential amplifier 69, which amplifies the signal difference between the preamplifiers 48 and 49 during the X scans and between the preamplifiers 65 and 66 during the Y scans. The output of the signal balancing means 58 is supplied to the negative input of the differential amplifier 69, and the output of the signal balancing means 60 is supplied to the positive input of the differential amplifier 69.

The signal balancing means 58 and 60 are utilized to automatically balance the signals from the detecting diodes 45 and 46 or 45′ and 46′ connected thereto through the electronic switches 57 and 59 or 61 and 62 in accordance with the location of the mark 42 relative to each of the detecting diodes 45 and 46 or 45' and 46'. Each of the marks 42 is disposed in a corner of the field 39 as shown in FIG. 16.

Figure 10:
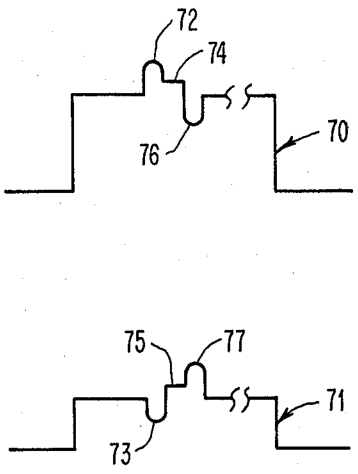
FIG. 10 shows the voltage curves produced by two detecting diodes during a scan without any balancing of the signals and with the ramp voltage omitted.

If the mark 42 is located in the upper right corner of the field 39, then the detecting diode 45 will be closer to the mark 42 than the detecting diode 46 since these are the detecting diodes used during X scans. As a result, the signal supplied from the detecting diode 45 has a higher background signal, which is produced from the beam 11 passing over the portion of the wafer 41 having the mark 42, than the diode 46. This is shown in FIG. 10 wherein a curve 70 represents the voltage output from the diode 45 and a curve 71 represents the voltage output from the diode 46 with each having the ramp voltage omitted. The background voltage of the curve 70 has a much larger amplitude than the background voltage of the curve 71.

When the beam 11 passes over one of the edges of one of the vertical bars 44 of the registration mark 42 during an X scan, the curve 70 has a positive peak 72 and the curve 71 has a negative peak 73. During movement of the beam 11 between the two edges of the vertical bar 44, the curve 70 has a pedestal 74 and the curve 71 has a pedestal 75. The pedestal, which produces a greater voltage than the background, is due to the depression of the vertical bar 44 causing a greater reflection of the beam 11 than is obtained when passing over portions of the wafer 41 not having the bar 44 therein. When the beam 11 exits from the depression of the bar 44 by passing over the other of its edges, the curve 71 has a negative peak 76 and the curve 71 has a positive peak 77.

Thus, if the signals from the diodes 45 and 46, as represented by the curves 70 and 71, were supplied to the differential amplifier 69, a curve 78 (see FIG. 1) would result in which there would not only be the difference in the background voltages of the curves 70 and 71 but also the difference in the pedestals of the curves 70 and 71. The difference in the pedestals 74 and 75 would cause a distortion to occur so that the positive and negative peaks, which indicate the location of the edges of each of the vertical bars 44, would be shifted to the right. This would give misleading data as to the location of each of the edges of each of the vertical bars 44 of the mark 42. It should be understood that the positive and negative peak signals from the other two of the three vertical bars 44 have not been shown in FIG. 10 for either of the curves 70 and 71.

Figure 11:
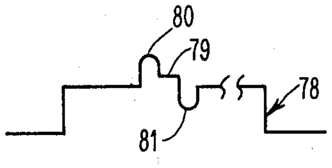
FIG. 11 shows a voltage curve indicating the difference between the two curves of FIG. 10.

As shown in FIG. 11, the curve 78 has a pedestal 79 therein which shifts both a positive peak 80 and a negative peak 81 to the right. It is necessary that the pedestal 79 be removed for accurate location of the edges of each of the vertical bars 44 of the mark 42 to be located.

Figure 4:
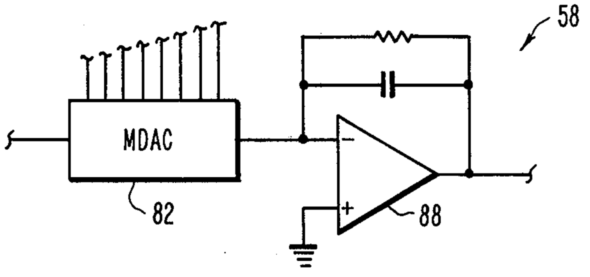
FIG. 4 is a schematic block diagram of the signal balancing means of FIG. 2.

The signal balancing means 58 and 60 are utilized to eliminate the distorted signal as represented by the curve 78. Thus, each of the signal balancing means 58 and 60 includes a multiplying digital to analog converter (MDAC) 82 as shown in FIG. 4 for the signal balancing means 58. One suitable example of the MDAC 82 is sold by Datel Systems, Inc. as model DAC MI 8B.

Figure 12:
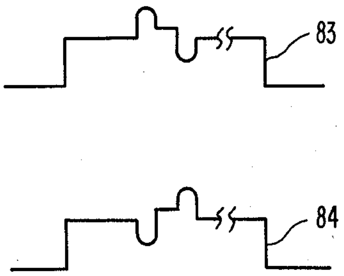
FIG. 12 shows the voltage curves produced by the detecting diodes with the signal balancing means of the present invention and with the ramp voltage omitted.

The MDAC 82 for each of the signal balancing means 58 and 60 supplies a different multiplying coefficient for the voltages of the curves 70 and 71 so that the background and pedestal voltages from each of the detecting diodes 45 and 46, for example, will be the same. The multiplied curve 70 is shown by curve 83 in FIG. 12 and the multiplied curve 71 is shown by curve 84. It should be understood that the curves 83 and 84 do not have the ramp voltage therein in the same manner as the curves 70 and 71 do not.

The multiplying coefficient from the MDAC 82 of the signal balancing means 58 for the curve 70 depends upon the location of the mark 42 in the field 39 of the wafer 41. Thus, when the mark 42 is located in the upper right hand corner, for example, so as to produce the curves 70 and 71, the multiplying coefficient from the MDAC 82 of the signal balancing means 58 reduces the amplitude of the voltage of the curve 70 as shown by the curve 83 in FIG. 12. Similarly, with the mark 42 in this location, the multiplying coefficient from the MDAC 82 of the signal balancing means 60 increases the amplitude of the voltage of the curve 71 as indicated by the curve 84 in FIG. 12.

The signals to the MDAC 82 of each of the signal balancing means 58 and 60 are supplied from the digital control unit 18. Thus, the digital control unit 18 supplies the signals in accordance with the location of the mark 42 within the field 39.

Figure 13:
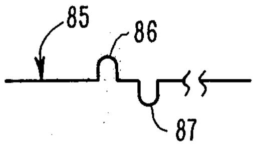
FIG. 13 is a voltage curve showing the difference between the two voltage curves of FIG. 12.

As a result of utilizing the MDAC 82 in each of the signal balancing means 58 and 60, the output voltage of the differential amplifier 69 is shown in FIG. 13 as curve 85 wherein there is no pedestal and no background. Instead, positive peak 86 and negative peak 87 of the curve 85 correctly indicate the locations of the edges of one of the vertical bars 44 of the mark 42. There is no pedestal because the pedestals of the curves 83 and 84 are equal so that the pedestal is omitted when the curves 83 and 84 are subtracted from each other by the differential amplifier 69. This also is true for the background voltages.

Figure 14:
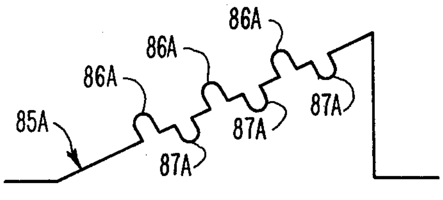
FIG. 14 is a voltage curve similar to FIG. 13 but with the ramp voltage therein.

It should be understood that the curve 85 of FIG. 13 does not have the ramp voltage therein. If the curve 85 had the ramp voltage therein, it would appear as curve 85A as shown in FIG. 14 with each positive peak being identified as 86A and each negative peak as 87A.

Because the MDAC 82 of each of the signal balancing means 58 and 60 has a current output, it is necessary to use an operational amplifier 88 (see FIG. 4) to convert the current output of each of the signal balancing means 58 and 60 to a voltage.

The output of the differential amplifier 69 is fed through a filter 89 (see FIG. 2) to an automatic gain control 90. The filter 89 is employed to remove the ramp voltage (see the curve 85A in FIG. 14) from the output of the differential amplifier 69 and to provide a residual baseline voltage, as shown in curve 90A in FIG. 15, in accordance with the surface of the wafer 41 at the time that the beam 11 is moving thereover in the area having the mark 42.

Figure 5:
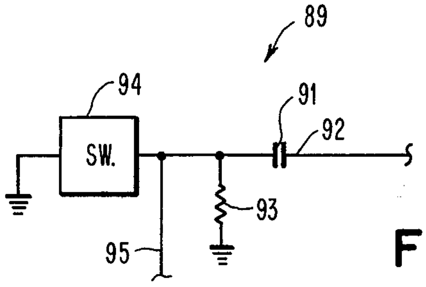
FIG. 5 is a schematic wiring diagram of the filter of the circuit of FIG. 2.

As shown in FIG. 5, the filter 89 includes a capacitor 91, which is connected by a line 92 to the output of the differential amplifier 69. The filter 89 also has a resistor 93 connected to ground and an electronic switch 94. At the start of each scan for a very short period of time, the electronic switch 94 is closed to discharge the capacitor 91 to ground. Thus, while the filter 89 is not effective during a very short initial portion of the scan, it is effective sufficiently to remove the ramp beyond the desired residual baseline voltage.

The filtered output is indicated by the curve 90A with the residual baseline voltage being the background voltage from which positive peaks 94B and negative peaks 94C extend. The residual baseline voltage begins to increase as soon as the electronic switch 94 is opened so that the capacitor 91 of the filter 89 can charge to the desired residual baseline voltage level.

The automatic gain control 90 controls the gain factor in accordance with the material of the portion of the wafer 41 having the mark 42 over which the beam 11 is scanning. The gain factor is obtained during a first scan of the beam 11 over the portion of the wafer 41 having the mark 42 and used throughout the remainder of the scans in the same direction over the mark 42. The automatic gain control 90 adjusts the signal on the subsequent scans to the predetermined amplitude in accordance with that determined during the first scan as defined by the gain factor.

Figure 6:
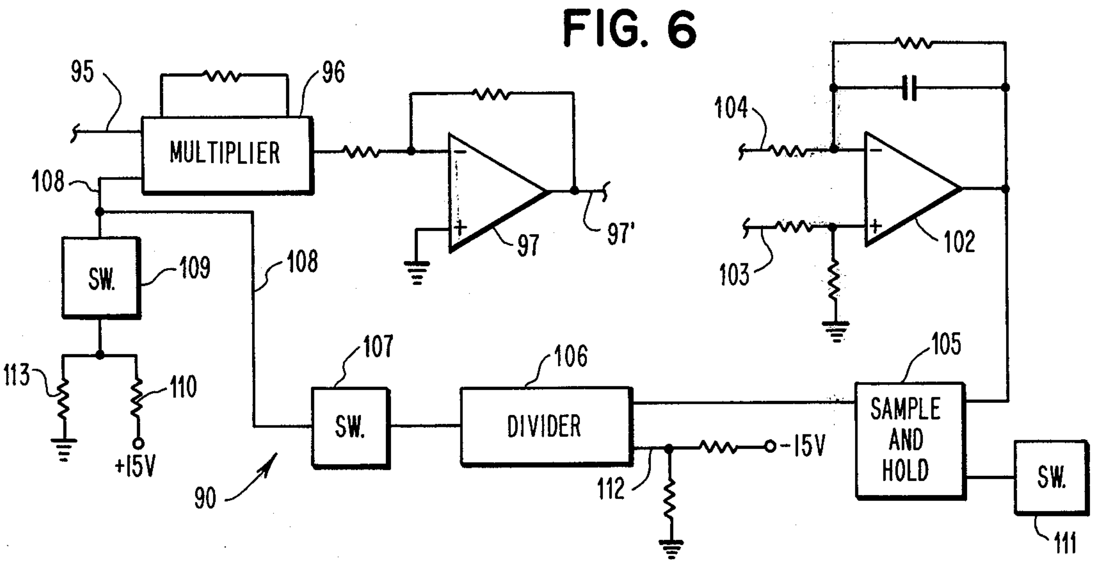
FIG. 6 is a schematic block diagram of the automatic gain control of the circuit of FIG. 2.

The output of the filter 89 is supplied by a line 95 as one of the two inputs to a multiplier 96 (see FIG. 6) of the automatic gain control 90. One suitable example of the multiplier is sold by Analog Devices Inc. as model 422A.

The output of the multiplier 96 is supplied through an inverting amplifier 97, which controls the gain and bandwidth of the signal, by a line 97' to an electronic switch 98, which is closed when the beam 11 is on during its scan and open when the beam 11 is blanked during its scans. This relationship of when the electronic switch 98 is closed with the beam 11 being on and off is shown in the timing diagram of FIG. 18.

The closing of the electronic switch 98 allows the output of the amplifier 97 of the automatic gain control 90 to be supplied to a positive peak detector 99 and a negative peak detector 100. The output of the positive peak detector 99 is supplied to the positive input of a differential amplifier 102 of the automatic gain control 90 by a line 103. The output of the negative peak detector 100 is supplied to the negative input of the differential amplifier 102 by a line 104.

The differential amplifier 102 has its output supplied to a sample and hold circuit 105, which has its output supplied as one of two inputs to a divider 106. The divider 106 is connected through an electronic switch 107 and a line 108 as the other of the two inputs to the multiplier 96. One suitable example of the sample and hold circuit 105 is sold by Analog Devices Inc. as model SHA-1A. One suitable example of the divider 106 is sold by Analog Devices Inc. as model AD530J.

Figure 18:
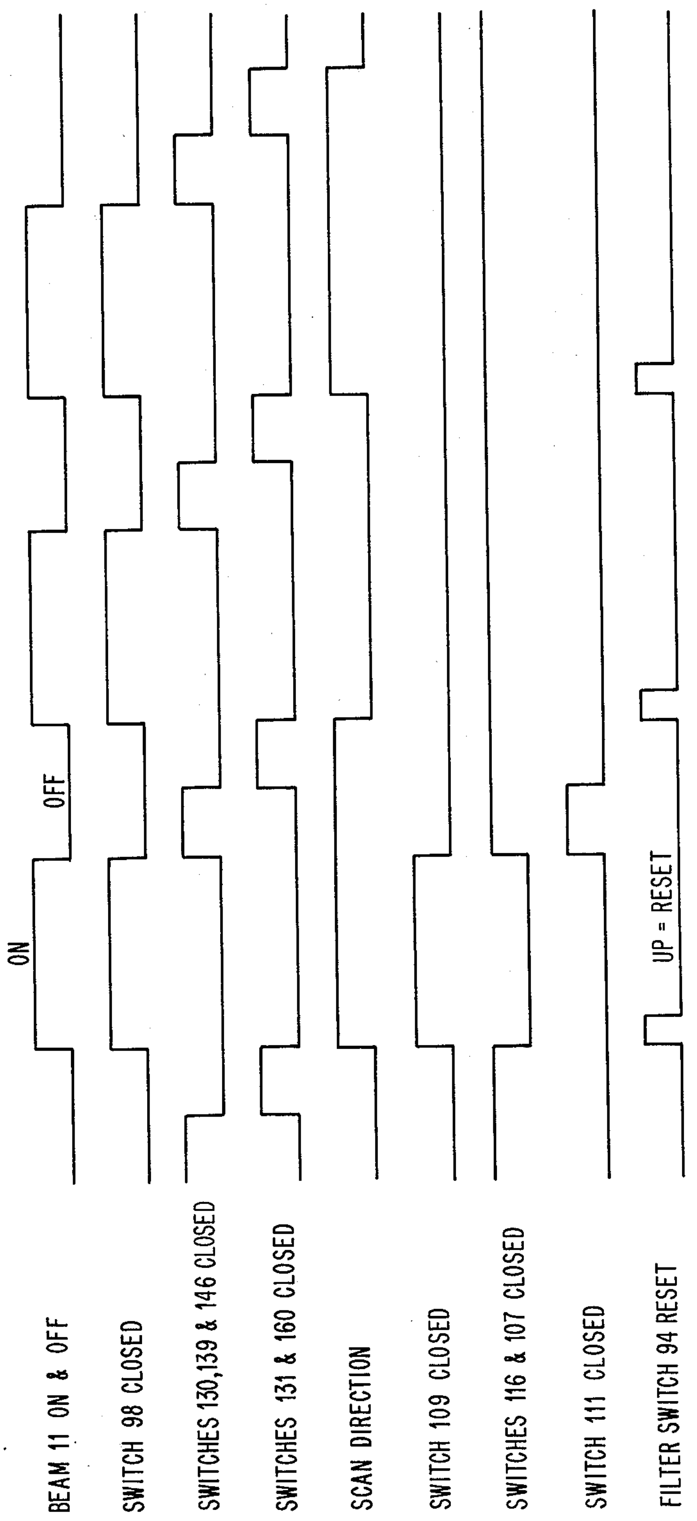
FIG. 18 is a timing diagram showing when various switches of the circuit of FIG. 2 are closed or opened in accordance with when the beam is on and off with the switch being closed when the pulse signal is up.

To set the gain factor for the automatic gain control 90 during all of the scans in the X direction, for example, over one of the marks 42, the gain factor is set during the first scan in the X direction. During the first scan with the beam 11 on, the electronic switch 98 is closed, and an electronic switch 109 is closed while the electronic switch 107 is open as shown in FIG. 18. The closing of the electronic switch 109 applies a positive voltage, which is 15 volts, through a resistor 110 as an input to the multiplier 96 over the line 108. The opening of the electronic switch 107 prevents the divider 106 from being an input to the multiplier 96.

Thus, the positive peak detector 99 receives a positive peak input equal to the product of the positive peak signal from the filter 89 and the voltage suppled over the line 108 through the closed electronic switch 109. Similarly, the negative peak detector 100 receives a negative peak input equal to the product of the negative peak signal from the filter 89 and the voltage supplied over the line 108 through the closed electronic switch 109.

Since the electronic switch 98 opens when the beam 11 is blanked prior to reversing its scan direction, the peak detectors 99 and 100 (see FIG. 2) are gated off by the opening of the electronic switch 98. At the time that the electronic switch 98 opens to gate off the peak detectors 99 and 100, an electronic switch 111 (see FIG. 6) is closed to gate the sample and hold circuit 105 to receive the output, which is the difference of the outputs of the peak detectors 99 and 100, of the differential amplifier 102. This relationship of closing of the electronic switch 111 to opening of the electronic switch 98 and the beam 11 being turned off is shown in FIG. 18.

The output of the sample and hold circuit 105 is continuously supplied to the divider 106. The divider 106 has a second constant input supplied thereto over a line 112. The output of the divider 106 is 10 Z/X' where X' is the output from the sample and hold circuit 105 and Z is the input from the line 112. The output of the divider 106 does not change during the remainder of the X scans since there is no further input to the sample and hold circuit 105.

The electronic switch 109 is opened when the beam 11 is turned off during the first scan. When the electronic switch 109 is opened, the positive voltage through the resistor 110 is supplied to ground through a resistor 113. Whenever the electronic switch 109 is opened, the electronic switch 107 is closed and vice versa as shown in FIG. 18.

Thus, as soon as the electronic switch 98 opens, the sample and hold circuit 105 receives its input and supplies this to the divider 106. Accordingly, the output of the divider 106 is supplied on the line 108 as one of the inputs to the multiplier 96 for all scans after the first scan. Since this output of the divider 106 is a fixed quantity, this insures that the same gain factor (the voltage from the divider 106) is applied as the input to the multiplier 96 on the line 108 throughout the remainder of the X scans across the mark 42.

It should be understood that the automatic gain control 90 is set again during the first scan when the beam 11 is moved in the Y direction. Similarly, when the beam 11 is moved to another of the marks 42, the automatic gain control 90 again has its gain factor set, first for the X scans and then for the Y scans.

In addition to the output of the automatic gain control 90 being supplied to the positive peak detector 99 (see FIG. 2) and the negative peak detector 100 when the electronic switch 98 is closed, the output of the automatic gain control 90 also is supplied over a line 115 when the electronic switch 98 is closed. The line 115 connects through an electronic switch 116 and a line 117 to a positive voltage comparator 118 and a negative voltage comparator 119. One suitable example of each of the comparators 118 and 119 is sold by Fairchild Semiconductor as model muA760.

The electronic switch 116 is opened during the first scan when the electronic switch 107 is opened and the electronic switches 98 and 109 are closed as shown in FIG. 18. Thus, the comparators 118 and 119 cannot receive any input during the first scan as the location of the mark 42 is not being made at that time.

The output of the automatic gain control 90 also is connected through a line 121 to a sample and average circuit 122. Whenever the electronic switch 98 is closed, the output of the automatic gain control 90 is transmitted over the line 121 to the sample and average circuit 122 during all scans when the beam 11 is on.

Figure 7:
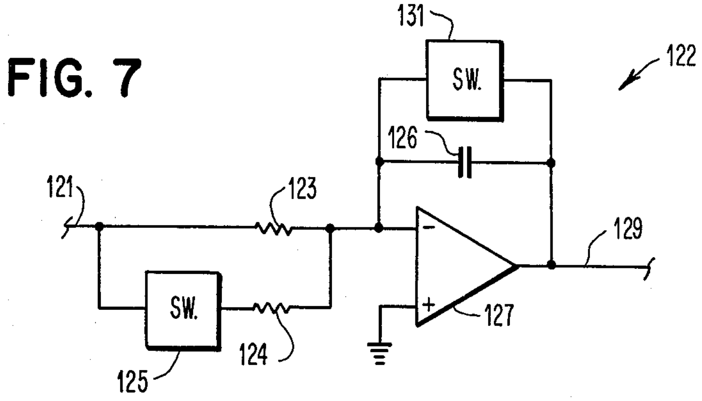
FIG. 7 is a schematic wiring diagram of the sample and average circuit of FIG. 2.

As shown in FIG. 7, the sample and average circuit 122 has a resistor 123 connected to the line 121. A resistor 124 also is connected to the line 121 and in parallel with the resistor 123 when an electronic switch 125 is closed. The electronic switch 125 is closed whenever one of the marks 42 in one of the corners of the field 39 is being scanned. If a registration mark in the corners of the wafer 41 is being scanned rather than the registration mark 42 in a corner of the field 39, then the electronic switch 125 is open so that the total resistance is larger since only the resistor 123 is effective. The larger resistance is necessary for scanning the wafer 41 rather than the field 39 since the scan for the wafer 41 is of longer duration.

The resistors 123 and 124 are connected to a capacitor 126, which is charged when the electronic switch 98 is closed. This is when the beam 11 is turned on during scanning.

An operational amplifier 127 is disposed in parallel with the capacitor 126 to supply the output of the capacitor 126 to a sample and hold circuit 128 (see FIG. 2), which is preferably the same as the sample and hold circuit 105, through a line 129. When the electronic switch 98 is opened to stop the supply of the output voltage of the automatic gain control 90 to the sample and average circuit 122, an electronic switch 130 is closed to gate the sample and hold circuit 128 so that it can receive the average signal from the scan in the sample and average circuit 122. Thus, at the end of the portion of each scan in which the beam 11 is turned off, the sample and hold circuit 128 receives the average voltage from the sample and average circuit 122. The output of the sample and hold circuit 128 is used during the next scan of the beam 11.

When the electronic switch 130 is opened to stop transfer from the sample and average circuit 122 to the sample and hold circuit 128, an electronic switch 131 (see FIG. 7) is closed to discharge the capacitor 126. This removes the average voltage of the sample and average circuit 122 from the scan before the next scan starts. The electronic switch 131 opens at the start of the next scan when the beam 11 turns on; this also is when the electronic switch 98 closes to again supply the voltage from the automatic gain control 90 to the sample and average circuit 122. This relation of the opening and closing of the switches 98, 130, and 131 is shown in FIG. 18.

The output of the sample and hold circuit 128 for the sample and average circuit 122 provides the residual baseline voltage on its output line 132 (see FIG. 2). The output line 132 of the sample and hold circuit 128 is connected through a resistor 133 to an input line 134 of a differential amplifier 135.

The other input to the input line 134 is from a sample and hold circuit 136, which is preferably the same as the sample and hold circuit 105, through a resistor 137. The sample and hold circuit 136 is connected by a line 138 to the output of the negative peak detector 100.

The output of the negative peak detector 100 is positive. This is an inversion of the input to the negative peak detector 100. It is necessary for the output of the negative peak detector 100 to be positive since the reverse scan of the beam 11 during the next scan produces positive peak signals from the beam 11 crossing the same edge of each of the vertical bars 44 of the registration mark 42.

Thus, the output of the differential amplifier 135 to the positive voltage comparator 118 provides a positive threshold signal for the positive voltage comparator 118. The comparator 118 is used during the next scan to ascertain when the positive peak signals, which are produced by the beam 11 crossing the same edge of each of the bars 44 of the mark 42 as produced the negative peak signals during the prior scan, occur.

The positive threshold signal is a voltage between the residual baseline voltage from the sample and hold circuit 128 and the peak voltage from the sample and hold circuit 136 with the resistances of the resistors 133 and 137 determining the magnitude of the positive threshold signal. The resistances of the resistors 133 and 137 are preferably equal so that the positive threshold voltage is half way between the outputs of the sample and hold circuit 128 and of the sample and hold circuit 136.

The sample and hold circuit 136 receives the positive output of the negative peak detector 100 on the line 138 when an electronic switch 139 is closed to gate the sample and hold circuit 136. This is the same time that the electronic switch 130 is closed and is when the beam 11 is turned off during the scan as shown in FIG. 18.

The output line 132 of the sample and hold circuit 128 also is connected through a resistor 140 to an input line 141 of a differential amplifier 142. The input line 141 of the differential amplifier 142 also is connected to a sample and hold circuit 143, which is preferably the same as the sample and hold circuit 105, through a resistor 144. The sample and hold circuit 143 is connected by a line 145 to the output of the positive peak detector 99.

The sample and hold circuit 143 has an electronic switch 146 to gate the sample and hold circuit 143 at the same time that the electronic switches 130 and 139 are closed. This is when the beam 11 is turned off during a scan. The output of the sample and hold circuit 143 for the positive peak detector 99 and the output of the sample and hold circuit 128 of the sample and average circuit 122 are supplied through the differential amplifier 142 to provide the negative threshold voltage for the negative voltage comparator 119.

The output of the positive peak detector 99 is negative. This is an inversion of the input to the positive peak detector 99. It is necessary for the output of the positive peak detector 99 to be negative since the reverse scan of the beam 11 during the next scan produces negative peak signals from the beam 11 crossing the same edge of each of the vertical bars 44 of the registration mark 42.

Thus, the output of the differential amplifier 142 to the comparator 119 provides a negative threshold signal for the negative voltage comparator 119. The comparator 119 is used during the next scan to ascertain when the negative peak signals, which are produced by the beam 11 crossing the same edge of each of the bars 44 of the mark 42 as produced the positive peak signals during the prior scan, occur.

The negative threshold signal is a voltage between the residual baseline voltage from the sample and hold circuit 128 and the peak voltage from the sample and hold circuit 143 with the resistances of the resistors 140 and 144 determining the magnitude of the negative threshold signal. The resistances of the resistors 140 and 144 are preferably equal so that the negative threshold voltage is half way between the outputs of the sample and hold circuit 128 and of the sample and hold circuit 143.

Accordingly, the threshold voltages for the comparators 118 and 119 are obtained at the end of a scan by the beam 11 and then used as the threshold voltages during the next scan. Thus, the threshold voltages for the comparators 118 and 119 are changed at the end of each scan so that the threshold voltages are those obtained from the prior scan.

Each time that there is an output pulse from the comparator 118 or the comparator 119, it is supplied through an OR gate 150 to open a gate 151 to allow information to be supplied to a feedback channel 152 of the digital control unit 18. A counter 153 supplies clock pulses through the gate 151, when it is activated by a signal to the OR gate 150 from the comparator 118 or 119, to the feedback channel 152 of the digital control unit 18 so that each of the edges of each of the vertical bars 44 can be ascertained by the computer 19. Thus, both edges of each of the vertical bars 44 of the registration mark 42 are supplied to the logic of the feedback channel 152 so that proper location of the mark 42 is rapidly determined.

Figure 8:
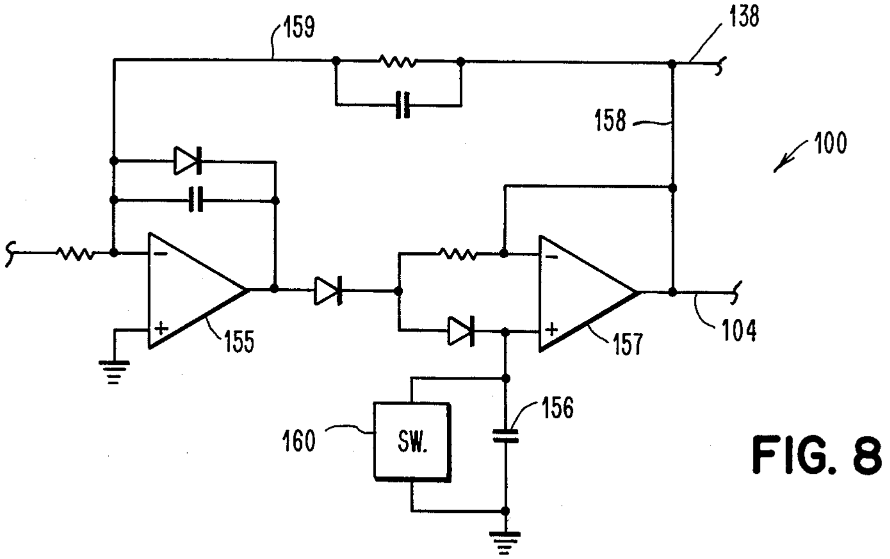
FIG. 8 is a schematic wiring diagram of the negative peak detector of the circuit of FIG. 2.

As shown in FIG. 8, the negative peak detector 100 includes an operational amplifier 155, which inverts the signal received at its negative input when the electronic switch 98 is closed. Thus, the output of the operational amplifier 155 is positive and is supplied to charge a capacitor 156. The positive charge of the capacitor 156 is supplied through an operational amplifier 157 as a positive output on the line 104 and on a line 158, which is connected to the line 138 to supply the output to the sample and hold circuit 136 (see FIG. 2) when it is gated by closing the electronic switch 139.

The line 158 (see FIG. 8) also is connected by a line 159 to the negative input of the operational amplifier 155 to provide a feedback of the opposite sign to that supplied to the operational amplifier 155 from the automatic gain control 90. Thus, the negative peak voltage applied to the negative peak detector 100 during a scan is provided as a positive peak output of the operational amplifier 157 since the only signal supplied through the operational amplifier 155 is one of the opposite polarity and greater than that at the output of the operational amplifier 157.

There is a gain of one between the input to the operational amplifier 155 and the output of the operational amplifier 157 along with the inversion. Accordingly, the capacitor 156 has a positive charge equal to the maximum negative input to the negative peak detector 100 during the scan.

An electronic switch 160 is disposed in parallel with the capacitor 156. The electronic switch 160 is closed at the same time as the electronic switch 131 (see FIG. 7) of the sample and average circuit 122 as shown in FIG. 18.

Closing of the switch 160 discharges the capacitor 156 to ground. Thus, as shown in FIG. 18, this occurs when the electronic switch 98 is open and prior to the electronic switch 98 again being closed to again allow the output from the automatic gain control 90 to be supplied to the negative peak detector 100.

The positive peak detector 99 functions in exactly the same way except that the direction of the diodes is reversed. Thus, a positive input to the positive peak detector 99 is inverted and appears as a negative pulse on the line 145 (see FIG. 2) and the line 103.

Considering the operation of the present invention, it will be assumed that the beam 11 is making X scans with the first X scan being in the +X direction. Just prior to the start of the first X scan, the electronic switch 131 of the sample and average circuit 122 and the electronic switch 160 of each of the positive peak detector 99 and the negative peak detector 100 were closed. As a result, the stored signals in the sample and average circuit 122, the positive peak detector 99, and the negative peak detector 100 are removed prior to the start of the first scan. Thus, the positive peak detector 99, the negative peak detector 100, and the sample and average circuit 122 are ready to receive information during the first X scan.

At the time that the beam 11 is turned on to begin the first X scan across the registration mark 42 of the semiconductor wafer 41, the electronic switch 131 of the sample and average circuit 122 and the electronic switch 160 of each of the positive peak detector 99 and the negative peak detector 100 are opened as shown in FIG. 18. This enables the positive peak detector 99, the negative peak detector 100, and the sample and average circuit 122 to again receive signals for storing.

At the time that the beam 11 begins the first X scan, the electronic switches 57 and 59 (see FIG. 2) are closed to transmit the signals from the detecting diodes 45 and 46 to the signal balancing means 58 and 60, respectively. The electronic switch 94 (see FIG. 5) of the filter 89 also is closed to discharge the capacitor 91 of the filter 89. The period of time for which the electronic switch 94 is closed is very short in comparison with the length of time that the beam 11 is on during the X scan as shown in FIG. 18. It is only during the initial portion of the scan that the electronic switch 94 is closed since it is necessary for the filter 89 to filter the signal from the output of the differential amplifier 69 during the scan of the beam 11 across the registration mark 42 of the wafer 41.

At the start of the first X scan, the electronic switch 109 (see FIG. 6) closes and the electronic switch 107 opens as shown in FIG. 18. This supplies the positive voltage of 15 volts as one of the inputs to the multiplier 96 (see FIG. 6) of the automatic gain control 90 (see FIG. 2).

At the start of the first scan, the electronic switch 98 is closed while the electronic switch 116 is opened as shown in FIG. 18. The closing of the electronic switch 98 enables the output of the automatic gain control 90 to be supplied to the positive peak detector 99, the negative peak detector 100, and the sample and average circuit 122. The opening of the electronic switch 116 disconnects the comparators 118 and 119 from the output of the automatic gain control 90.

Thus, as the beam 11 makes its first X scan, the output from the differential amplifier 69 is supplied through the automatic gain control 90 to the positive peak detector 99, the negative peak detector 100, and the sample and average circuit 122 but not to the comparators 118 and 119. The outputs of the positive peak detector 99 and the negative peak detector 100 are supplied to the differential amplifier 102 (see FIG. 6) of the automatic gain control 90 during the first X scan for use in obtaining the gain factor for the remainder of the X scans.

At the end of the first X scan, the electronic switch 111 is closed, as shown in FIG. 18, to gate the sample and hold circuit 105 of the automatic gain control 90 whereby the output of the differential amplifier 102 is stored in the sample and hold circuit 105. The electronic switch 111 is closed only for the first portion of the time when the beam 11 is off prior to the beam 11 reversing the direction of its X scan.

This is the only time that the sample and hold circuit 105 receives an output from the differential amplifier 102 during all of the X scans to locate the edges of the vertical bars 44 of the registration mark 42 being scanned. This locks out the remainder of the scans insofar as changing the gain factor of the automatic gain control 90.

The differential amplifier 102 provides the peak to peak amplitude of the signals during the first X scan. By disabling the sample and hold circuit 105 after it receives the output from the differential amplifier 102 when the beam 11 is turned off during the first X scan as shown in FIG. 18 by the electronic switch 111 opening, the peak to peak amplitude is maintained throughout the remainder of the X scans over the registration mark 42 being scanned. Thus, the gain factor from the automatic gain control 90 automatically compensates for the particular conditions of the wafer 41 in the portion having the registration mark 42 being scanned.

The electronic switch 109 is opened as soon as the beam 11 is turned off during the first X scan. The electronic switch 107 and the electronic switch 111 are both closed when the electronic switch 109 is opened as shown in FIG. 18. As a result, the output of the divider 106 is supplied to the multiplier 96 for the remainder of the X scans over the registration mark 42 being scanned. Thus, by the time that the second X scan starts, the multiplier 96 will have the output of the divider 106 as determined by the output of the sample and hold circuit 105, which has received the output of the differential amplifier 102 after the beam 11 is turned off during its first X scan by the electronic switch 111 closing.

At the same time that the electronic switch 107 is closed, the electronic switch 116 (see FIG. 2) is closed. The closing of the switch 116 connects the output of the automatic gain control 90 to each of the comparators 118 and 119 throughout the remainder of the X scans over the registration mark 42 being scanned whenever the electronic switch 98 is closed.

When the beam 11 is turned off during the first X scan, the electronic switches 130, 139, and 146 are closed, as shown in FIG. 18, to gate the sample and hold circuits 128, 136, and 143, respectively. This information is transferred to the comparators 118 and 119 but is not utilized since there is no supply through the line 117 from the automatic gain control 90 during the first scan since the electronic switch 116 was open.

After gating the sample and hold circuits 128, 136, and 143, the electronic switches 130, 139, and 146 are opened with the beam 11 still in its first X scan but the beam 11 turned off. When the electronic switches 130, 139, and 146 are opened, the electronic switches 131 and 160 are closed as shown in FIG. 18. The closing of the electronic switch 131 (see FIG. 7) discharges the capacitor 126 of the sample and average circuit 122. The closing of the switch 160 (see FIG. 8) discharges the capacitor 156 of each of the positive peak detector 99 and the negative peak detector 100.

The electronic switches 131 and 160 are opened at the time that the beam 11 reverses its direction of scan and is turned on as shown in FIG. 18. Thus, each of the positive peak detector 99, the negative peak detector 100, and the sample and average circuit 122 receives the information from the second X scan since the electronic switch 98 also is closed at the same time that the electronic switches 131 and 160 are opened.

During the second X scan, the positive peak detector 99 stores the maximum positive peak signal, the negative peak detector 100 stores the negative peak signal, and the sample and average circuit 122 obtains an average of the signal from the automatic gain control 90.

During this scan, the electronic switch 116 is closed since it has remained closed from the time that the beam 11 was turned off during the first X scan and remains closed throughout the remainder of the X scans over the registration mark 42 being scanned as shown in FIG. 18. Thus, the positive voltage comparator 118 and the negative voltage comparator 119 continue to receive the output of the automatic gain control 90 whenever the electronic switch 98 is closed.

However, it is only during the second X scan that the automatic gain control 90 has the desired gain factor for the portion of the wafer 41 having the registration mark 42 being scanned. Therefore, it is only when the beam 11 is turned off during the second X scan that there can be outputs from the positive peak detector 99, the negative peak detector 100, and the sample and average circuit 122 for use with the comparators 118 and 119 to provide the threshold voltages therein.

It should be understood that the output pulses from the comparators 118 and 119 are not effective during the second scan. The digital control unit 18 prevents the information, which is supplied to the feedback channel 152, from being utilized during the second X scan. It is only during the third X scan that the information from the outputs of the comparators 118 and 119 is utilized to locate the edges of each of the vertical bars 44 of the mark 42.

During the second X scan, the positive peak detector 99 detects the positive peak signal from the automatic gain control 90 and the negative peak detector 100 detects the negative peak signal from the automatic gain control 90. The sample and average circuit 122 averages the output from the automatic gain control 90.

When the beam 11 is turned off during the second X scan, the electronic switches 130, 139, and 146 are closed, as shown in FIG. 18, to gate the sample and hold circuits 128, 136, and 143, respectively. Thus, the sample and hold circuit 128 will contain the average voltage from the second X scan throughout the third scan and supply it over the line 132 to the differential amplifiers 135 and 142. The sample and hold circuit 136 will maintain a positive pulse, which is indicative of the negative peak signal during the second scan, throughout the third scan.

As previously mentioned, the crossing of a particular edge of one of the vertical bars 44 of the mark 42 by the beam 11 during the second scan to produce a negative peak signal produces a positive peak signal during the third scan since the beam 11 is moving in the opposite direction. Thus, the peak signal is always being compared with the edge on the same side of each of the vertical bars 44 of the registration mark 42.

The sample and hold circuit 143 produces a negative output, which is indicative of the positive peak voltage during the second X scan, throughout the third scan. Thus, the peak signal is always being compared with the edge on the same side of each of the vertical bars 44 of the registration mark 42 and is the opposite edge of each of the bars 44 from that supplying the signal to the sample and hold circuit 136.

Therefore, the positive voltage comparator 118 has a threshold voltage during the third X scan correlated to the residual baseline voltage and the inverted negative peak voltage during the second scan. The comparator 118 has the same threshold voltage throughout the third scan.

Similarly, the negative voltage comparator 119 has a threshold voltage during the third scan correlated to the residual baseline voltage and the inverted positive peak signal during the second scan. The comparator 119 has the same threshold voltage throughout the third scan.

During the second scan with the beam 11 turned off, the electronic switches 130, 139, and 146 are opened about half way through the length of time that the beam 11 is blanked off during the second scan as shown in FIG. 18. When the electronic switches 130, 139, and 146 are opened, the electronic switches 131 and 160 are closed during the second X scan with the beam 11 off as shown in FIG. 18. The closing of the electronic switch 131 (see FIG. 7) discharges the capacitor 126 to remove the residual baseline voltage from the sample and average circuit 122. The closing of the switch 160 (see FIG. 8) in each of the positive peak detector 99 and the negative peak detector 100 discharges the capacitor 156 of the detector. This removes the stored peak signal from each of the positive peak detector 99 and the negative peak detector 100.

The electronic switches 131 and 160 are opened when the beam 11 is turned on to start the third scan as shown in FIG. 18. As a result, the positive peak detector 99, the negative peak detector 100, and the sample and average circuit 122 again receive the output of the automatic gain control 90 during the third X scan.

Figure 15:
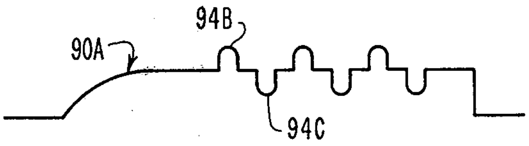
FIG. 15 is the voltage curve of FIG. 14 with the ramp voltage removed by the filter of FIG. 2 of the present invention but leaving a residual baseline voltage.

At the start of the third X scan, the electronic switch 94 (see FIG. 5) closes for a short period of time to discharge the capacitor 91 of the filter 89 so that the filter 89 can become effective to produce a substantially constant residual baseline voltage during the third scan as shown by the curve 90A in FIG. 15. At the start of the third scan by the beam 11, the switch 98 (see FIG. 2) also closes to again allow the automatic gain control 90 to supply the output from the diodes 45 and 46.

In each of the X scans after the second scan, the positive voltage comparator 118 produces an output when its threshold voltage is crossed by the input on the line 117 from the automatic gain control 90. This causes the OR gate 150 to produce an output pulse to cause the gate 151 to allow the clock pulse from the counter 153 to be supplied to the feedback channel 152. As a result, the location of each of the positive peak signals can be determined by the computer 19.

In a similar manner, the negative voltage comparator 119 supplies an output pulse during each scan after the second scan. The output pulse from the negative voltage comparator 119 is produced when the negative threshold voltage is crossed by the output from the automatic gain control 90. The output pulse from the negative voltage comparator 119 enables the computer 19 to again determine the location of the negative peak signal.

The eighteen scans for the registration mark 42 in the X direction after the first two scans are employed to insure averaging of the location of the registration mark 42. This reduces the per cent of error to a satisfactory minimum.

After the beam 11 completes its twenty scans with the reversal of the beam 11 after each scan, the beam 11 scans in the Y direction over the same registration mark 42 to ascertain the location of each of the edges of each of the horizontal bars 43 of the mark 42. There would be a total of twenty scans in the Y direction.

When the beam 11 is to scan in the Y direction, the digital control unit 18 supplies different multiplying coefficients to the MDAC 82 (see FIG. 4) of each of the signal balancing means 58 (see FIG. 2) and 60. The electronic switches 57 and 59 are opened and the electronic switches 61 and 62 are closed to enable the detecting diodes 45' and 46' disposed at opposite ends of the Y scan to supply their signals to the differential amplifier 69. The remainder of the operation in the Y scans would be the same as that in the X scans.

With the information in the feedback channel 152 as to the location of the registration mark 42 with respect to its desired location, the location of the field 39 can be determined by the four registration marks 42 at the four corners of the field 39 as more particularly shown and described in the aforesaid Michail et al application.

It should be understood that the beam 11 requires the use of a focus grid and a calibration grid in the same manner as described in the aforesaid Kruppa et al patent. One suitable example of these grids is the focus and calibration grids of the aforesaid Kruppa et al patent.

While each of the registration marks 42 has been described as having the bars 43 and 44 formed as depressions, it should be understood that the bars 43 and 44 could be formed otherwise as long as they produced a signal when the beam 11 passed over each edge thereof. For example, each of the bars 43 and 44 could be a raised portion.

While the threshold voltages have been disclosed as being used from the prior scan, it should be understood that the threshold voltage could be utilized from the prior scan in the same direction. This would necessitate the output signals of the positive peak detector 99 and the negative peak detector 100 not being inverted.

While the present invention has shown and described the beam 11 as having its direction reversed during each scan, it should be understood that such is not necessary for operation of the present invention as the beam 11 could scan in only one direction as shown and described in the aforesaid Kruppa et al patent. However, scanning in only one direction would reduce the speed of operation and would require certain changes in the circuitry. For example, the positive peak detector 99 and the negative peak detector 100 would have to be designed to not have their output signals inverted.

Figure 9:
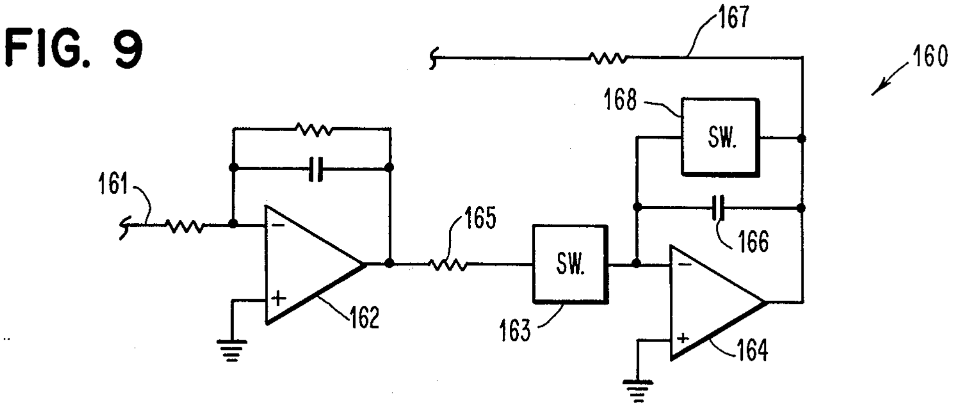
FIG. 9 is a schematic wiring diagram of the auto bias circuit of FIG. 2.

If the filter 89 is not used, an auto bias circuit 160 must be employed to remove the background component of the signal from the output of the differential amplifier 69. Thus, the differential amplifier 69 would have its output connected to the automatic gain control 90 without passing through the filter and also would have its output connected through a line 161 to an inverting amplifier 162 (see FIG. 9) of the auto bias circuit 160.

If the auto bias circuit 160 is used, it would be necessary for the automatic gain control 90 to have its gain factor set in the second scan rather than the first scan. Thus, only seventeen scans would be available for sampling and locating rather than eighteen.

If th auto bias circuit 160 is employed, an electronic switch 163 is closed during the time that the beam 11 is on during the first scan. The closing of the switch 163 results in an integrating amplifier, which comprises an operational amplifier 164, a resistor 165, and a capacitor 166, integrating the inverted output from the inverting amplifier 162.

The output from the integrating amplifier is supplied over a line 167 to the negative input of the differential amplifier 69 (see FIG. 2). This feedback causes the output of the differential amplifier 69 to go to zero through the feedback increasing or decreasing until the inputs to the differential amplifier 69 are equal.

Prior to the start of the first scan, an electronic switch 168 (see FIG. 9) is closed to discharge the capacitor 166 of the auto bias circuit 160. Thus, the auto bias circuit 160 is ready for the first scan of the beam 11.

An advantage of this invention is that differential signals from the diode detectors are balanced to compensate for the position of the registration mark relative to the detectors. Another advantage of this invention is that the threshold voltage is changed in accordance with the prior scan or the prior scan in the same direction. A further advantage of this invention is that the peak to peak amplitudes for the signals from the diode detectors are automatically controlled irrespective of the wafer type, the mark geometry, and the conditions of the wafer and the mark. Still another advantage of this invention is that it eliminates signal distortions.

While the invention has been particularly shown and described with reference to a preferred embodiment thereof, it will be understood by those skilled in the art that various changes in form and details may be made therein without departing from the spirit and scope of the invention.

What is claimed is:

1. An apparatus for determining the location of a registration mark on a target including:

means to sense the beginning and the end of the registration mark when the registration mark is scanned by a beam of charged particles during a plurality of scans;

said sensing means includes means disposed on opposite sides of the registration mark, each of said disposed means producing a first peak electrical signal at the beginning of the registration mark and a second peak electrical signal at the end of the registration mark with the two peak electrical signals from each of said disposed means being of opposite polarity, each of said disposed means producing peak electrical signals of opposite polarity at the same time;

means to balance the peak electrical signals from said disposed means to cause the signals from each of said disposed means to have substantially the same amplitude irrespective of the location of one of said disposed means relative to the registration mark in comparison with the location of the other of said disposed means relative to the registration mark;

means to obtain the difference of the signals from said disposed means to produce a first peak electrical signal designating the beginning of the registration mark and a second peak electrical signal designating the end of the registration mark;

first means to produce a first threshold signal correlated to one of the peak electrical signals from said obtaining means and to a baseline voltage determined by the surface of the target in the area having the registration mark;

second means to produce a second threshold signal correlated to the other of the peak electrical signals from said obtaining means and to the baseline voltage determined by the surface of the target in the area having the registration mark;

third means to produce a first signal when one of the peak electrical signals from said obtaining means crosses the first threshold signal;

fourth means to produce a second signal when the other of the peak electrical signals from said obtaining means crosses the second threshold signal;

and means to determine the positions of the beginning and end of the registration mark in accordance with the positions of the beam when the first signal from said third means and the second signal from said fourth means are produced.

2. The apparatus according to claim 1 in which:

said first means changes the first threshold signal after each scan of the registration mark by the beam;

and said second means changes the second threshold signal after each scan of the registration mark by the beam.

3. The apparatus according to claim 2 in which:

said first means produces the first threshold signal in accordance with the one peak electrical signal from said obtaining means during the prior scan;

and said second means produces the second threshold signal in accordance with the other peak electrical signal from said obtaining means during the prior scan.

4. The apparatus according to claim 3 including means to remove any ramp from the signals from said obtaining means.

5. The apparatus according to claim 4 including:

means to control the amplitude of the signals from said obtaining means during scans across the registration mark in accordance with the peak to peak amplitude of the peak signals from said obtaining means during an earlier scan across the registration mark;

said control means becoming effective in the scan after the scan in which the peak to peak amplitude of the peak signals is obtained from said obtaining means;

and said determining means determining the positions only in the scans after said control means is effective.

6. The apparatus according to claim 3 including:

means to control the amplitude of the signals from said obtaining means during scans across the registration mark in accordance with the peak to peak amplitude of the peak signals from said obtaining means during an earlier scan across the registration mark;

said control means becoming effective in the scan after the scan in which the peak to peak amplitude of the peak signals is obtained from said obtaining means;

and said determining means determining the positions only in the scans after said control means is effective.

7. The apparatus according to claim 6 in which the target is a semiconductor wafer.

8. The apparatus according to claim 1 including means to remove any ramp from the signals from said obtaining means.

9. The apparatus according to claim 1 including:

means to control the amplitude of the signals from said obtaining means during scans across the registration mark in accordance with the peak to peak amplitude of the peak signals from said obtaining means during an earlier scan across the registration mark;

said control means becoming effective in the scan after the scan in which the peak to peak amplitude of the peak signals is obtained from said obtaining means;

and said determining means determining the positions only in the scans after said control means is effective.

10. The apparatus according to claim 1 in which the target is a semiconductor wafer.

11. An apparatus for determining the location of a registration mark on a target including:

means to sense the beginning of the registration mark and the end of the registration mark when the registration mark is scanned by a beam of charged particles during a plurality of scans;

said sensing means including means to produce a first peak electrical signal at the beginning of the registration mark and a second peak electrical signal at the end of the registration mark with the two peak electrical signals being of opposite polarity;

means to remove any ramp from the signals from said producing means while providing a residual baseline voltage in accordance with the surface of the target in the area having the registration mark;

first means to produce a first threshold signal correlated to one of the peak electrical signals and to the residual baseline voltage;

second means to produce a second threshold signal correlated to the other of the peak electrical signals and to the residual baseline voltage;

third means to produce a first signal when one of the peak electrical signals crosses the first threshold signal;

fourth means to produce a second signal when the other of the peak electrical signals crosses the second threshold signal;

and means to determine the positions of the beginning and end of the registration mark in accordance with the positions of the beam when the first signal from said third means and the second signal from said fourth means are produced.

12. The apparatus according to claim 11 in which:

said first means changes the first threshold signal after each scan of the registration mark by the beam;

and said second means changes the second threshold signal after each scan of the registration mark by the beam.

13. The apparatus according to claim 12 in which:

said first means produces the first threshold signal in accordance with the one peak electrical signal from said producing means of said sensing means during the prior scan;

and said second means produces the second threshold signal in accordance with the other peak electrical signal from said producing means of said sensing means during the prior scan.

14. The apparatus according to claim 13 in which the target is a semiconductor wafer.

15. A method of locating a registration mark on a target defined by at least one pair of edges by moving a beam of charged particles over the area of the target having the registration mark in a plurality of line-by-line scans including:

making a scan over the area of the target having the registration mark to obtain the peak to peak amplitude of the positive and negative peak signals produced from the beam passing over the edges of the registration mark and obtaining a gain factor therefrom for use in the remainder of the scans;

making a plurality of additional scans over the area of the target having the registration mark to ascertain the highest positive and negative peak signals produced from the beam passing over the edges of the registration mark during each scan and a residual baseline voltage in accordance with the material of the area having the registration mark;

selecting a voltage between one of the peak signals and the residual baseline voltage during a scan to produce a positive threshold signal for a later scan with the initial selection occurring during the scan after the scan for obtaining the gain factor;

selecting a voltage between the other of the peak signals and the residual baseline voltage during a scan to produce a negative threshold signal for a later scan with the initial selection occurring during the scan after the scan for obtaining the gain factor;

producing a first signal when one of the positive and negative threshold signals is crossed by a signal produced by the beam passing over one of the pair of edges of the registration mark during each of the scans after any scan in which the threshold voltage signals are initially selected;

producing a second signal when the other of the positive and negative threshold signals is crossed by a signal produced by the beam passing over the other of the pair of edges of the registration mark during each of the scans after any scan in which the threshold voltage signals are initially selected;

and utilizing the first and second signals after any scan in which the threshold voltage signals are initally selected in conjunction with the location of the beam during the scan in which each of the first and second signals is produced to locate the position of the registration mark on the target.

16. The method according to claim 15 including removing any ramp from the residual baseline voltage and the positive and negative peak signals obtained during each scan.

17. The method according to claim 16 in which each of the positive and negative peak electrical signals is obtained through measuring the backscatter of electrons beyond opposite ends of the scan and balancing the signals produced by the measurements so that the signals from the measurements have substantially the same amplitude irrespective of the location of the mark relative to where the backscatter of the electrons is measured.

18. The method according to claim 17 in which the target is a semiconductor wafer.

19. The method according to claim 18 in which each of the scans is in the opposite direction to the prior scan.

20. The method according to claim 19 including selecting each of the threshold signals during the prior scan.

21. The method according to claim 15 in which each of the positive and negative peak electrical signals is obtained through measuring the backscatter of electrons beyond opposite ends of the scan and balancing the signals produced by the measurements so that the signals from the measurements have substantially the same amplitude irrespective of the location of the mark relative to where the backscatter of the electrons is measured.

22. The method according to claim 21 in which the target is a semiconductor wafer.

23. A method of locating a registration mark on a target defined by at least one pair of edges by moving a beam of charged particles over the area of the target having the registration mark in a plurality of line-by-line scans including:

making a plurality of scans over the area of the target having the registration mark to ascertain a residual baseline voltage in accordance with the material of the area having the registration mark during each scan and to ascertain the highest positive and negative peak signals produced from the beam passing over the edges of the registration mark during each scan;

selecting a voltage between one of the peak signals and the residual baseline voltage during a scan to produce a positive threshold signal for a later scan;

selecting a voltage between the other of the peak signals and the residual baseline voltage during a scan to produce a negative threshold signal for a later scan;

producing a first signal when one of the positive and negative threshold signals is crossed by a signal produced by the beam passing over one of the pair of edges of the registration mark during each of the scans after any scan in which the threshold voltage signals are initially selected;

producing a second signal when the other of the positive and negative threshold signals is crossed by a signal produced by the beam passing over the other of the pair of edges of the registration mark during each of the scans after any scan in which the threshold voltage signals are initially selected;

and utilizing the first and second signals after any scan in which the threshold voltage signals are initially selected in conjunction with the location of the beam during the scan in which each of the first and second signals is produced to locate the position of the registration mark on the target.

24. The method according to claim 23 including removing any ramp from the residual baseline voltage and the positive and the negative peak signals obtained during each scan.

25. The method according to claim 24 in which each of the positive and negative peak electrical signals is obtained through measuring the backscatter of electrons beyond opposite ends of the scan and balancing the signals produced by the measurements so that the signals from the measurements have substantially the same amplitude irrespective of the location of the mark relative to where the backscatter of the electrons is measured.

26. The method according to claim 25 in which the target is a semiconductor wafer.

27. The method according to claim 26 in which each of the scans is in the opposite direction to the prior scan.

28. The method according to claim 27 including selecting each of the threshold signals during the prior scan.

29. The method according to claim 23 in which each of the positive and negative peak electrical signals is obtained through measuring the backscatter of electrons beyond opposite ends of the scan and balancing the signals produced by the measurements so that the signals from the measurements have substantially the same amplitude irrespective of the location of the mark relative to where the backscatter of the electrons is measured.

30. The method according to claim 29 in which the target is a semiconductor wafer.

31. A method of locating a registration mark on a target defined by at least one pair of edges by moving a beam of charged particles over the area of the target having the registration mark in a plurality of line-by-line scans including:

making a plurality of scans over the area of the target having the registration mark to ascertain a residual baseline voltage in accordance with the material of the area having the registration mark during each scan and to ascertain the highest positive and negative peak signals produced from the beam passing over the edges of the registration mark during each scan;

selecting a voltage between one of the peak signals and the residual baseline voltage during a scan to produce a positive threshold signal for at least one later scan;

selecting a voltage between the other of the peak signals and the residual baseline voltage during a scan to produce a negative threshold signal for at least one later scan;

obtaining each of the positive and negative peak electrical signals through measuring the backscatter of electrons beyond the opposite ends of the scan and balancing the signals produced by the measurements so that the signals from the measurements have substantially the same amplitude irrespective of the location of the mark relative to where the backscatter of the electrons is measured;

producing a first signal when one of the positive and negative threshold signals is crossed by a signal produced by the beam passing over one of the pair of edges of the registration mark during any scan after the scan in which the threshold voltages are selected for the later scan;

producing a second signal when the other of the positive and negative threshold signals is crossed by a signal produced by the beam passing over the other of the pair of edges of the registration mark during any scan after the scan in which the threshold voltages are selected for the later scan;

and utilizing the first and second signals after the scan in which the threshold voltages are selected for the later scan in conjunction with the location of the beam during the scan in which each of the first and second signals is produced to locate the position of the registration mark on the target.

32. The method according to claim 31 including:

selecting the voltage between the one peak signal and the residual baseline voltage during each of the prior scans to produce a positive threshold signal for the next scan;

and selecting the voltage between the other peak signal and the residual baseline voltage during each of the prior scans to produce a negative threshold signal for the next scan.

* * * * *